US012738838B2

(12) United States Patent
Le Lesle et al.

(10) Patent No.: US 12,738,838 B2
(45) Date of Patent: Sep. 15, 2026

(54) GATE DRIVER CIRCUIT AND PROCESS FOR REDUCING DEAD TIME DURATION UPON SWITCHING

(71) Applicant: MITSUBISHI ELECTRIC CORPORATION, Tokyo (JP)

(72) Inventors: Johan Le Lesle, Rennes Cedex (FR); Guillaume Lefevre, Rennes Cedex (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 19/122,089

(22) PCT Filed: Jul. 7, 2023

(86) PCT No.: PCT/JP2023/025971

§ 371 (c)(1),
(2) Date: Apr. 17, 2025

(87) PCT Pub. No.: WO2024/100927

PCT Pub. Date: May 16, 2024

(65) Prior Publication Data

US 2025/0330166 A1 Oct. 23, 2025

(30) Foreign Application Priority Data

Nov. 10, 2022 (EP) .................................... 22315275

(51) Int. Cl.
*H02M 1/38* (2007.01)
*H02M 1/08* (2006.01)

(52) U.S. Cl.
CPC ............... *H02M 1/38* (2013.01); *H02M 1/08* (2013.01)

(58) Field of Classification Search
None
See application file for complete search history.

(56) References Cited

U.S. PATENT DOCUMENTS 7,436,160 B2 * 10/2008 Rusu .................... H03K 17/284 323/284
10,461,732 B1 * 10/2019 Norling ................ H03K 17/168
(Continued)

FOREIGN PATENT DOCUMENTS

| | | |
|---|---|---|
| CN | 106160447 A | 11/2016 |
| EP | 2 618 486 A2 | 7/2013 |
| EP | 2 846 447 A2 | 3/2015 |

OTHER PUBLICATIONS

Horff et al., "Analysis of Reverse-Recovery Behaviour of Sic Mosfet Body-Diode—regarding Dead-Time", PCIM Europe 2015: International Exhibition and Conference for Power Electronics, Intelligent Motion, Renewable Energy and Energy Management, Nuremberg, Germany, May 19-21, 2015, pp. 1114-1121.
(Continued)

*Primary Examiner* — Thomas J. Hiltunen
(74) *Attorney, Agent, or Firm* — Birch, Stewart, Kolasch & Birch, LLP

(57) ABSTRACT

Gate driver circuit, for a half bridge of a converter where a first switching device and a second switching device are controlled independently and in a complementary way comprising a first gate current mirroring circuit on a sink branch of a first gate driver buffer and a second gate current mirroring circuit on a sink branch of a second gate driver buffer to provide, in advance from pulse signals issued from the controller, a first early gate pullup command signal issuing from the first gate current mirroring circuit, for the second gate driver buffer under a turning off of a first switching device and a second early gate pullup command signal issuing from the second gate current mirroring circuit, for the first gate driver buffer from a turning off of a second switching device, in advance from gate pull up pulse signals issued from the controller.

8 Claims, 6 Drawing Sheets

(56) References Cited

U.S. PATENT DOCUMENTS

| | | | | |
|---|---|---|---|---|
| 11,469,755 | B2 * | 10/2022 | Jeon | H03K 17/161 |
| 11,881,771 | B2 * | 1/2024 | Fan | G05F 1/613 |
| 12,395,070 | B2 * | 8/2025 | Arosio | H02M 1/385 |
| 12,395,164 | B2 * | 8/2025 | Hiyama | H03K 17/00 |
| 2008/0246519 | A1 * | 10/2008 | Suzuki | H03K 17/165 327/141 |
| 2022/0239223 | A1 * | 7/2022 | Liao | H02M 1/08 |
| 2023/0145900 | A1 * | 5/2023 | Le Lesle | H03K 17/04206 324/127 |
| 2026/0045881 | A1 * | 2/2026 | Lo | H02M 3/33523 |

OTHER PUBLICATIONS

The International Search Report (PCT/ISA/210) issued in PCT/JP2023/025971, mailed on Oct. 19, 2023.

The Written Opinion of the International Searching Authority (PCT/ISA/237) issued in PCT/JP2023/025971, mailed on Oct. 19, 2023.

Yuasa et al., "Ultra High Speed Short Circuit Protection for IGBT with Gate Charge Sensing", Proceedings of The 22nd International Symposium on Power Semiconductor Devices & ICs, 2010 22nd International Symposium On, IEEE, Piscataway, NJ, USA, Jun. 6, 2010, pp. 37-40.

* cited by examiner

GATE DRIVER CIRCUIT AND PROCESS FOR REDUCING DEAD TIME DURATION UPON SWITCHING

TECHNICAL FIELD

The present disclosure concerns power converter comprising at least one switching half-bridge and more precisely concerns the reduction of dead time during switching transition periods of switches of said switching half-bridge.

BACKGROUND ART

In a power converter composed of at least one half-bridge, semiconductor switching devices are controlled independently and in a complementary way from conducting to blocking, and from blocking to conducting transitions. Between these transitions, dead-times where both switching devices are OFF, that is blocking, are mandatory. The dead-time corresponds to a switching transition period (hereafter transition period) starting with the on/off command of a first switch and ending with the off/on command of a second switch. The main reason of introducing dead-times is the risk of overlapping of the control voltage of the power switches due to multiple factors including propagation delay, mismatch between the turn-on and turn-off delay times of the switching devices, drifting of the threshold voltage with temperature and so on, which may lead to shoot-through currents which could damage the semiconductor switching devices. To avoid this and ensure a current continuity during dead-time (DT), either freewheeling diodes or intrinsic reverse capability of the switching devices, such as Body diode in case of a MOSFET or the third quadrant conduction capability of a lateral Gallium Nitride (GaN) device, are used.

Although mandatory, this reverse conduction phase is the cause of disadvantages in the converter operation. To reduce the number of components, and the associated cost, some power modules are not equipped with antiparallel diode and rely on the reverse capability of the switching devices. However, the switching performance or the conduction performance of such intrinsic diode (bipolar) of the device is often strongly lower than the ones of an external diode especially a Schottky barrier one (unipolar). Thus, the dead-time duration has a significant impact on the power losses of the converter.

Some distortions are also induced in the control loops due to the non-linearity related to dead-time. Smart control methods can be implemented to reduce the dead-time according to the operation point, by using a look-up table. The reverse conduction time is then limited as much as possible. Meanwhile fast computation capabilities are required, which usually need faster and more expensive controllers.

Some state-of-the-art solutions are briefly introduced hereafter:

In document CN 106160447 A, a dead-time optimization circuit is proposed in which the optimization relies on several sensors sensing the gate voltage, the drain-source voltage and the load current. The current sensor allows to determine the output current direction, defining the free-wheeling device. The voltage sensors mainly monitor the voltage transient being dependent on the load current and/or the temperature. Then, the dead-time optimization is done through a microcontroller. Therefore, the additional sensors and microcontroller make the solution quite complex to implement and more expensive than a classical gate driver.

In another solution, the dead-time is controlled by a logical circuit fed by a current sense FET integrated into a SiC power MOSFET switch device. The sense FET corresponds to few cells of the overall device that are externally connected, giving an image of the main device current, being proportional to the surface ratio of the sensors and the power device. This technique precisely informs of the switch state, ON or OFF, enabling the reduction of the dead-time through the associated gate circuit. In fact, the proposed method is very effective and robust as the temperature dependency is inherently considered through the integrated sense FET. However, it relies on an expensive and very specific technology and very few founders are proposing power devices with such an integrated current sensor.

In the same way, the method presented in document EP 2 846 447 A2 also reduces the dead-time by sensing the current flowing through the switching device. In this case, current shunts are inserted in the switching cell. However, such sensing technique is not recommended as it can significantly increase the stray inductance of the switching cell. This issue is even more of concern when dealing with wide band gap devices (WBG) such as Silicon Carbide (SiC) and/or Gallium Nitride (GaN) as the fast current derivative associated to higher stray inductance leads to significant voltage overshoot.

In document EP 2 618 486 A3 the dead-time control relies on gate current measurement and a current transformer is located between the two gate driver circuits to provide retroaction between said circuits. By doing so, the gate voltage derivatives are equal in amplitude but of opposite sign. The main drawback of this method is the insertion of an inductive device in the gate loop which is potentially slowing down the switching transient.

Generally, a fast and precise control of the two semiconductor switching devices is mandatory in a power converter. Nevertheless, Wide Band Gap devices such as SiC or GaN have fast switching capabilities which permit to increase the switching frequency but increases the constraints on the control.

As explained above, commonly implemented half-bridge configurations require a dead-time avoiding cross-conduction and shoot-through current. However, such dead time can lead to significant additional losses or even to the destruction of the semiconductors if not properly controlled.

During the dead-time transition period, one of the semiconductor devices can carry the current in reverse conduction mode. However, high losses may be generated during the reverse conduction mode, mainly due to the poor characteristic of the body-diode, e.g. high forward voltage, reverse recovery charge as discussed in R. Horff, A. März, and M.-M. Bakran, "*Analysis of Reverse-Recovery Behaviour of SiC MOSFET Body-Diode-regarding Dead-Time*" in Proceedings of PCIM Europe 2015; International Exhibition and Conference for Power Electronics, Intelligent Motion, Renewable Energy and Energy Management, 2015, pp. 1114-1121. Additionally, the conduction performances may also be degraded during the dead-times. As an example, when using the body diode of a MOSFET, the on-state voltage is significantly higher compared to a MOSFET operating in the third quadrant (conductive channel, negative current).

To mitigate the losses, an antiparallel diode (e.g., SiC Schottky Barrier Diode) with better performances (lower voltage drops and zero recovery charge) can be added to operate during the dead-time. Nevertheless, even if the reverse recovery issue is alleviated, there is still additional loss due capacitive charge. This is a costly solution (more silicon required) which generally leads to bigger systems (two components instead of one) and additional stray inductance due to complementary wiring.

According to the dead-time reduction methods presented hereabove, additional constraints and/or drawbacks can also be identified. First, several methods are implemented through complex circuit requiring additional measurements, either voltage and/or current, and/or a microcontroller. Even if these solutions are efficient, they are not cost effective. Moreover, the insertion of current sensors into the switching cell can degrade the power loop, leading to higher voltage overshoot and oscillations. In some cases, it is the gate loop that is degraded by the circuit, reducing the switching speed of the power converter and making the gate voltage more prone to oscillate. In addition, the dead-time reduction is achievable until a certain point otherwise shoot-through current may appear during the transition period, potentially leading to dramatic failure.

SUMMARY OF INVENTION

The method and device proposed in the present disclosure intends to reduce the dead-time, mandatory in voltage source converter, thus mitigating the impact of the body-diode without the risk of shoot-through current.

More precisely the present disclosure proposes a gate driver circuit, for a half bridge of a converter where a first switching device, having a first gate, and a second switching device, having a second gate, are controlled independently and in a complementary way respectively through a first gate driver buffer and a second gate driver buffer, and a controller providing gate pull up and gate pull down pulse signals to the first and second gate drivers buffers, which comprises a first gate current mirroring circuit on a sink branch of said first gate driver buffer and a second gate current mirroring circuit on a sink branch of said second gate driver buffer to provide, in advance from said pulse signals issued from the controller, a first early gate pullup command signal issuing from the first gate current mirroring circuit, for the second gate driver buffer under a turning off of said first switching device and a second early gate pullup command signal issuing from the second gate current mirroring circuit, for the first gate driver buffer from a turning off of said second switching device, in advance from gate pull up pulse signals issued from the controller.

The use of gate mirroring circuits provides an accurate view of gate command signals without causing perturbations on the gate commands.

The gate driver buffers associated to the current mirroring circuits may be driven by pre-driver circuits transferring control signals from the controller to the gate drivers buffers and providing a first galvanic insulation between said controller and said gate driver buffers.

This provides the separation between the controller and gate command circuits.

The early gate pullup command signals of the first gate mirroring circuit and the second gate mirroring circuit are transferred respectively to the second gate driver buffer and to the first gate driver buffer through second galvanic insulation means.

This allows to provide the early gate pull-up command signals from the top switch to the lower switch and vice versa regardless the top and the bottom gate driver power supplies having different electrical references connections.

The gate driver circuit may comprise for each gate driver buffer, a mixer circuit where said early gate pullup command signal is combined with the gate pulse signal issued from said pre-driver after said first galvanic insulation means.

The gate driver circuit may comprise conditioning and/or amplifier means of said early command signals.

The gate driver circuit may comprise a reset circuit which is configured to reset the early gate pullup command signal upon occurrence of the gate pull up pulse signals issued from the controller. Such reset circuit is duplicated in both upper leg gate driver and lower leg gate driver of the half-bridge.

The disclosure concerns also a process for reducing the dead time duration upon switching of switches in a half bridge of a converter comprising sensing of a gate current in a gate driver circuit during an on to off switching transition of a first switch of said half bridge using current mirror to provide a mirrored gate current signal, transferring said mirrored gate current signal through a galvanic insulation circuit, conditioning said mirrored gate current signal to create a gate pull-up command signal, combining said gate pull-up command signal with the gate command signal of a second switch of said half bridge in order to provide an advanced off to on transition of said second switch.

The process may comprise resetting said gate pull-up command signal upon occurrence of gate activating pulses of said gate command signal.

A detailed description of exemplary embodiments disclosed will be discussed hereunder in reference to the attached drawings.

DESCRIPTION OF EMBODIMENTS

Figure 1:
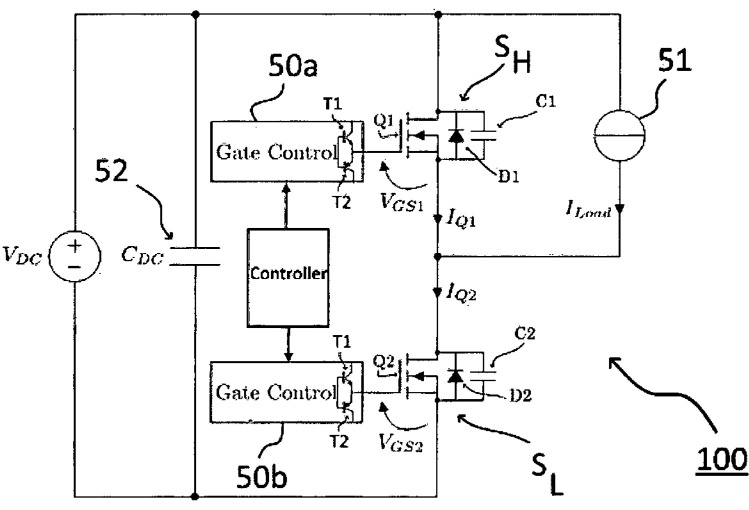
FIG. 1 is a schematic view of a traditional half bridge in a converter.

FIG. 1 is a schematic view of a half bridge in a converter with upper leg switch SH and lower leg switch SL the upper leg switch comprises a transistor Q1 which is in the present case a MOSFET represented with its body diodes D1 and its parasitic output capacitor C1 while the lower leg switch comprises transistor Q2 represented with its body diode D2 and parasitic output capacitor C2. The reverse diodes D1 and D2 may be an additional component.

The switches are controlled through gate control circuits 50*a* for the upper leg switch and 50*b* for the lower leg switch and a capacitor 52 on the DC side filters the HF signals created by the switching sequences. The gate control circuits 50*a*, 50*b* comprise push-pull output transistors as known in the art.

Starting from such basic schematics, a first part of the present disclosure concerns a circuit that aims at reducing as much as possible the time interval during which both semiconductor switching devices, hereafter switches, being part of a switching leg implemented in any kind of voltage source converter, are off while the output current continuity only relies on the reverse conduction capability of one of the two switches. The proposed method is based on a current mirror technique where current mirror circuits allow to sense the gate current of one switch during its turn-off transition periods and where the mirrored current is then transferred and added to the gate driver control signal of the other switch through an insulation barrier. A conditioning and/or buffer circuit can be implemented to be able to reduce the dead-time in the desired way.

Dealing with the dead-time reduction the turn-off transition period of the conducting device is a key point.

Assuming an initial condition being one device is conducting the load current (gate voltage at high level) while the other is blocking the DC voltage (gate voltage at low level), the proposed invention will only be active during the transition period. The main steps are as follows:

When a conductive switch device such as device $S_H$ in FIG. 1 is turned off, its gate voltage goes from high level to low level.

Figure 2:
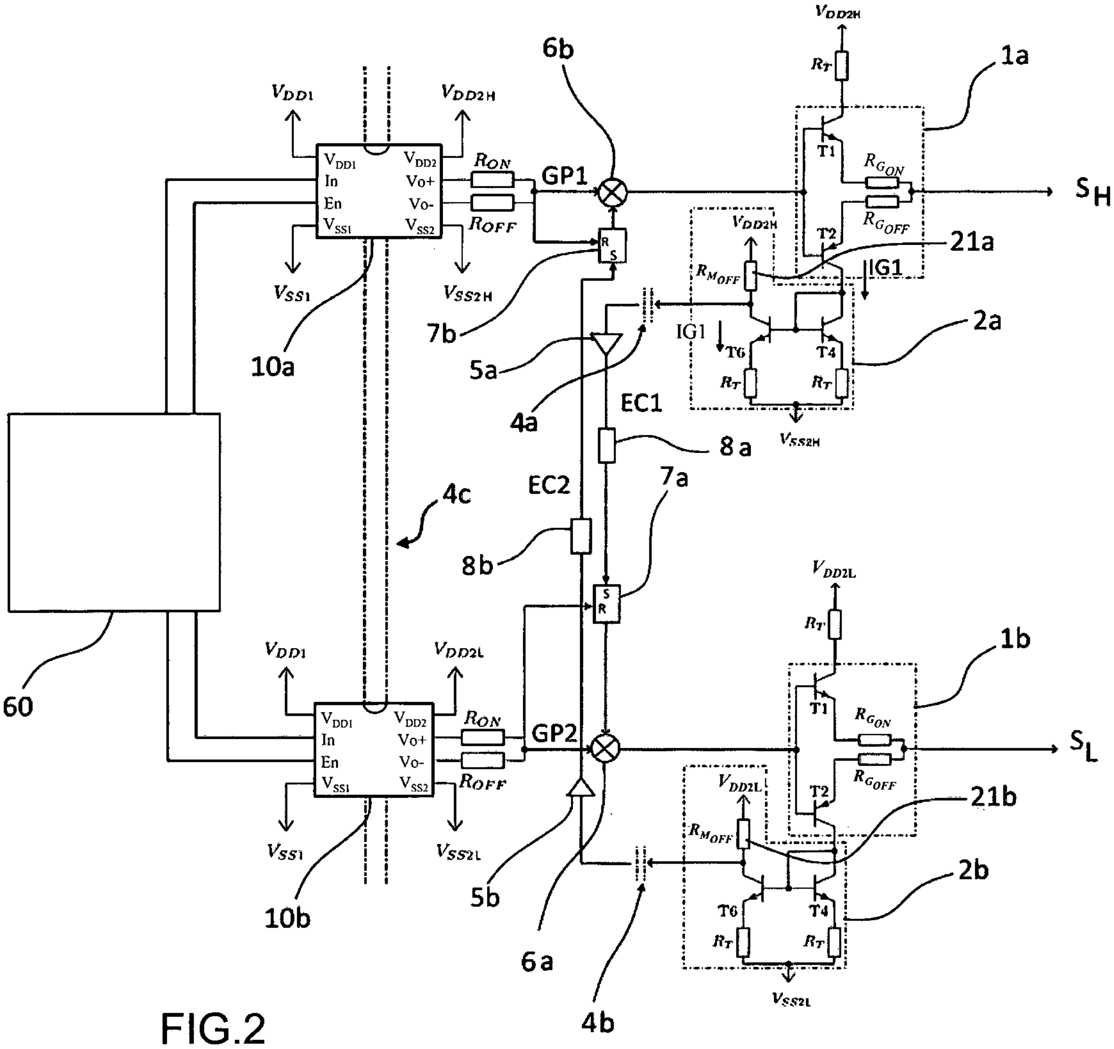
FIG. 2 is a schematic view of an example of dead time reduction circuit according to an embodiment of the present disclosure.

Turning to FIG. 2, this is done through the push pull transistors T1, T2 of a gate driver buffer 1*a*. This turning off of Q1 creates a gate current IG1 flowing through the gate driver buffer 1*a* pull down transistor T2.

The circuit presented in FIG. 2 summarizes the key functions for a dead-time reduction circuit. The circuits for both switches are similar and the hereunder description is made for the circuit driving the switch $S_H$. The gate driver buffer 1*a* is a classical buffer driving the power device through one or two gate resistances. In this case, a push-pull made of BJT T1, T2 is presented, nevertheless it can also be made of MOSFET. The other part is the current mirror 2*a* for the current discharging the gate, such current mirror being called sink current mirror.

In the present disclosure, the sink current of a switch gate driver e.g., switch $S_H$ is mirrored by the sink mirroring circuit 2*a* of such gate. The sink mirroring circuit comprising transistors T4 and T6 without degrading the gate loop. The obtained current signal flowing through the mirroring circuit resistor $R_{MOFF}$ 21*a* and the collector of T6 of the mirroring circuit 2*a* may be directly sensed as a current, or as the voltage generated across the mirroring circuit resistor $R_{MOFF}$ 21*a*. The obtained signal, either current or voltage, is transferred to the opposite gate driver through a link comprising an insulation barrier 4*a*, a conditioner and/or amplifier 5*a* to provide a pulse signal which is delayed due to conditioner and/or amplifier inherent propagation delay time, represented by the delay circuit 8*a*, latched in the set/reset circuit 7*a* resulting in a pull up signal combined with the output of the pre-driver 10*b* of the gate buffer circuit 1*b* of the opposite switch, e.g., switch $S_L$ in an mixer function 6*a*. The conditioned and latched signal, which can be amplified as needed, controls the gate buffer 1*b* to pull the gate voltage of said opposite switch e.g., switch $S_L$ up to high level in advance to the controller signal issued by the controller 60. This reduces the dead-time during the OFF to ON transition of said opposite switch. The set/reset circuit 7*a* allows the pull up signal to be kept high until arrival of the controller signal and released when the controller gate command signal GP2 rises. The same circuit is provided in the gate command circuit of the opposite switch e.g., switch $S_L$ in order to provide an advance control of the switch $S_H$ with the mirroring circuit 2*b* providing a signal at resistor 21*b* which passes insulation barrier 4*b*, is amplified in amplifier 5*b*, delayed in delay circuit 8*b* and latched in set/reset circuit 7*b*. This pull up signal provides an advance driving signal to the gate buffer 1*a*.

This system is activated during the transition periods and, once the controller 60 initiates turn on of said opposite switch e.g., switch $S_L$ after turning off of a first switch e.g., switch $S_H$, the advanced signal is replaced by the signal coming from the controller 60 to maintain the gate voltage at the high level until the next switching transition. The same process applies to the ON to OFF transition of the Switch $S_L$ in which the gate of switch $S_H$ is pulled up in advance of the controller command signal.

In the sink current mirroring circuits 2*a*, 2*b*, the transistor T4 are in diode configuration as the base and collector electrodes are shorted. The current flowing through T4's collector, being the gate current during turn-off, generates a corresponding base-emitter voltage (VBE) being the same VBE voltage for the transistor T6. Therefore, the current flowing through T6 will be the image of the gate current. The mirror resistor 21*a*, 21*b* RMOFF should be less or equal to the overall gate resistance (RGTot) of the switches to obtain a current with the same amplitude. In the case of RMOFF>RGTot the maximal current is capped and equal to $$\frac{(V_{DD} - V_{SS} - VCE_{Sat})}{R_{MOFF}}.$$

Usually, the transistors T4 and T6 are matched transistors, having the same gain (β) and sharing the same package. The transistors selected to design the current mirrors must have the same, or close, characteristics as the ones in the buffer (current capability, gain-bandwidth product). The current mirror circuits are not limited to BJT components.

Then, the mirrored current signal taken at RMOFF 21*a*, 21*b* is injected into the dead-time circuit through an isolation device 4*a*, 4*b* and since the transferred signal can either be a voltage or a current, e.g., the voltage across the mirror resistance 21*a*, 21*b* or the current flowing through it. The isolation device may be, depending on the situation, an optocoupler, a current transformer, a voltage transformer or even a digital isolator.

The signals EC1, EC2 transferred through the isolation devices 4*a*, 4*b* is then amplified in amplifiers 5*a*, 5*b*, delayed in delay circuits 8*a*, 8*b*, latched in latch circuits 7*a*, 7*b* and added at mixers 6*a*, 6*b* to the gate pulse signal GP2, GP1 of the lower switch $S_L$ and upper switch $S_H$ causing an advanced turn-on switching for said lower switch and upper switch at their respective turn on event to reduce the dead time duration.

Figure 3A:
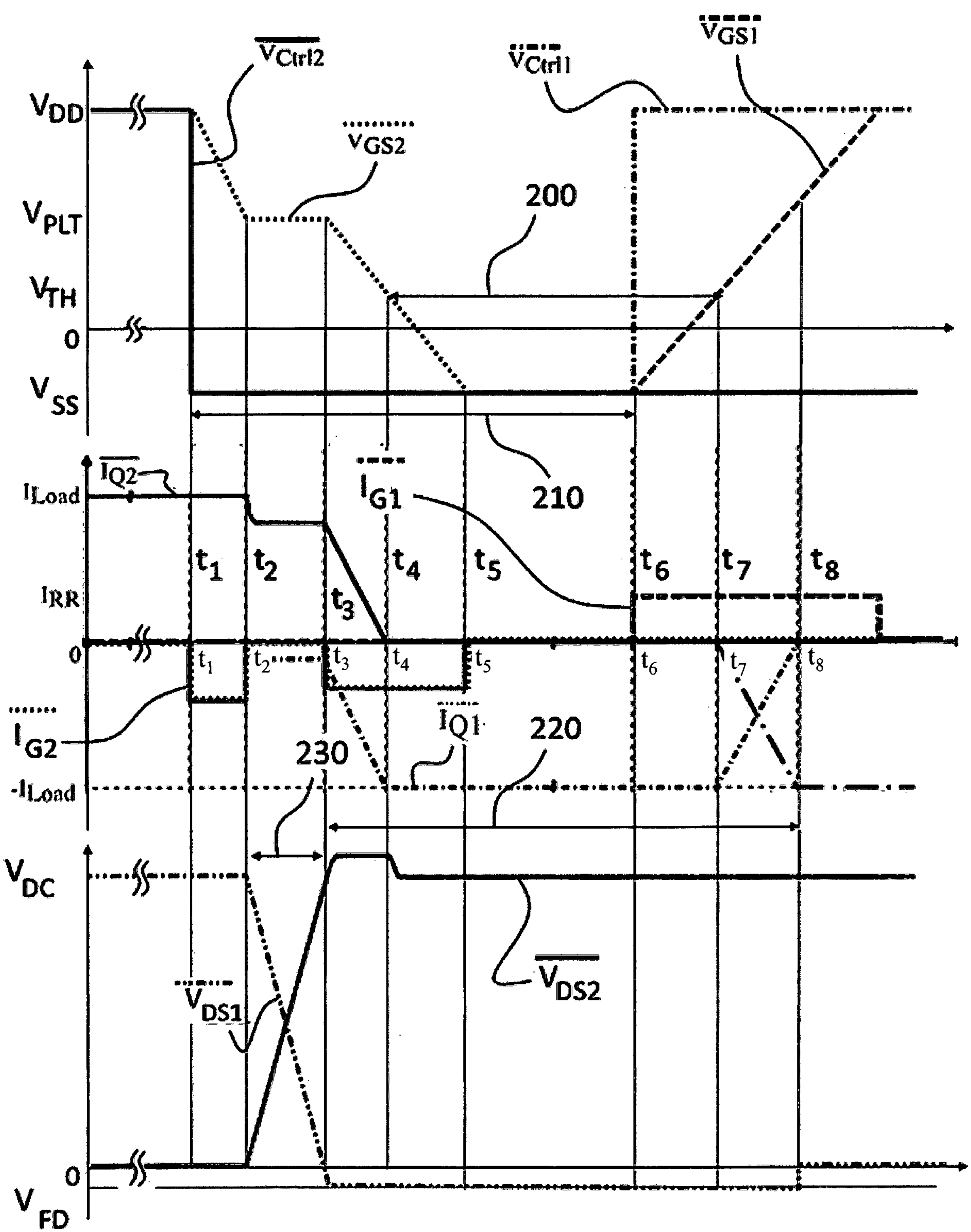
FIG. 3A shows a chart showing traditional dead time timings.

A classical switching transient during turn off of the bottom switch $S_L$ and turn on of the upper switch $S_H$ is depicted in FIG. 3A.

Starting with the bottom switch $S_L$, at t=0; $S_L$ bottom switch MOS Q2 is conducting the load current and the top $S_H$ switch MOS Q1 is holding the DC voltage. At t1 turn-off is initiated and the control signal $V_{Ctrl2}$ of $S_L$ toggles from a positive value to a negative value. The gate source voltage $V_{GS2}$ of $S_L$ drops from $V_{DD}$ to the Miller plateau $V_{PLT}$ at t2. In fact, during this time interval a gate current $I_{G2}$ is sank by the gate buffer. During the Miller plateau, from t2 to t3, Q2's drain source voltage $V_{DS2}$ rises from 0 to $V_{DC}$ while Q1's drain source voltage drops accordingly. As soon as $V_{DS1}$ reaches 0, the channel current, being controlled by the gate voltage, drops until $V_{GS2}$ crosses the threshold voltage $V_{TH}$, at t4. To ensure the output current continuity the body diode D1 of Q1 starts to conduct the current. After the settled dead-time, being the time interval from t1 to t6, the control signal $V_{Ctrl1}$ of switch $S_H$ toggles from low to high level.

The body diode D1 continues to carry the current until the gate source reaches $V_{TH}$ at t7. From t7 to t8 the current will pass from the body diode D1 to the channel of Q1 according to the gate voltage. Note that a gate current IG1 is sourced by the gate buffer according to the gate voltage derivative. The switching transition period can be considered complete as soon as the channel of Q1 is conducting all the output current, corresponding to t8.

In this configuration, the theoretical dead time 210 is between t1 and t7 and the active dead time 200 is between t4 and t7. Q2 reverse conduction 220 starts at t3 and ends at t8 while $V_{DS2}$ raises from 0 to VDC between t2 and t3 the crossing time 230.

As explained above and illustrated in FIG. 3A, every switching transient starts by turning off the conducting device. Therefore, two reference signals can be selected to reduce the effective dead-time, it can be done through gate voltage or gate current measurement. Using the sensed gate voltage would not be representative of the real voltage across the die electrodes because of the potentially too high gate loop. Thus, it can lead to sub-optimised operation, not properly reduced dead time or worst, too short dead time leading to shoot-through current. Therefore, the present disclosure uses current sensing which is a more reliable state variable even with far sensing method. The following is presenting the impact of the invention on the switching waveforms.

Figure 3B:
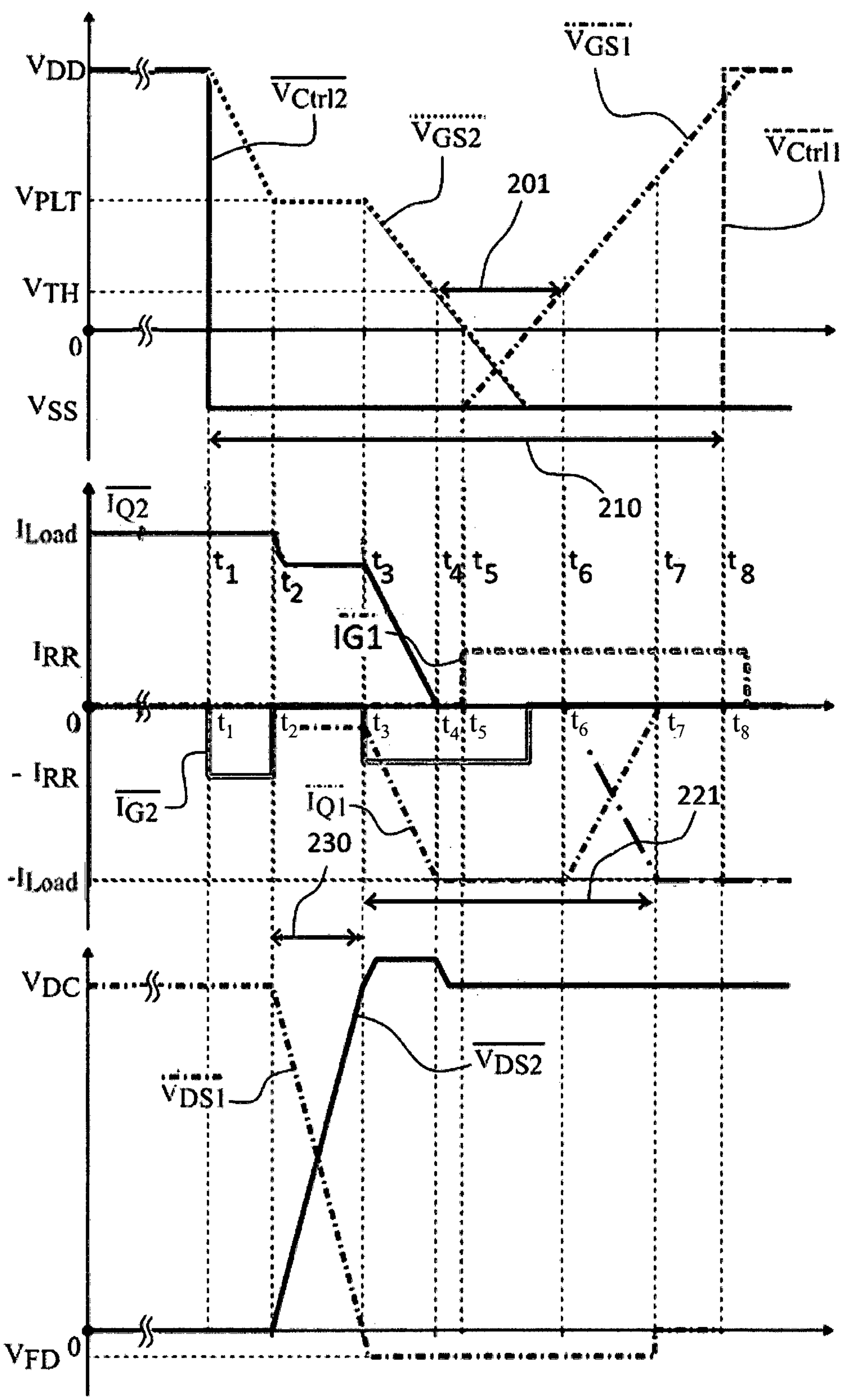
FIG. 3B shows a chart of timings with dead time reduction according to the present disclosure.

The result of the current sensing of the device of the present disclosure is shown in FIG. 3B where the turn-off/turn on process remains the same as in FIG. 3A but the main change is that the gate charge, being proportional to the current.time product and depending on the power switch characteristics of the turning off device $S_L$ is also driving the turning on device $S_H$ by implementing the current mirror circuit of FIG. 2 to get an image of the gate current $I_{G2}$ that produces a signal delayed through a delay circuit 8*a*, and which is reinjected into the gate driver of the upper switch $S_H$, either by converting this current into a voltage or directly by using the current. Therefore, in FIG. 3B, $V_{GS1}$ the gate voltage of the opposite device starts rising before receiving the corresponding signal $V_{CTRL1}$ from the controller. Thus, the reverse conduction time 221 of the body diode can be significantly reduced to t3-t7 as illustrated. The equivalent gate charge is defined in the way that the turning off device will always reach the threshold voltage $V_{TH}$ before the turning on device.

The delay circuit is tuned to initiate rising of $V_{GS1}$ after $V_{GS2}$ has crossed 0V.

Figure 3C:
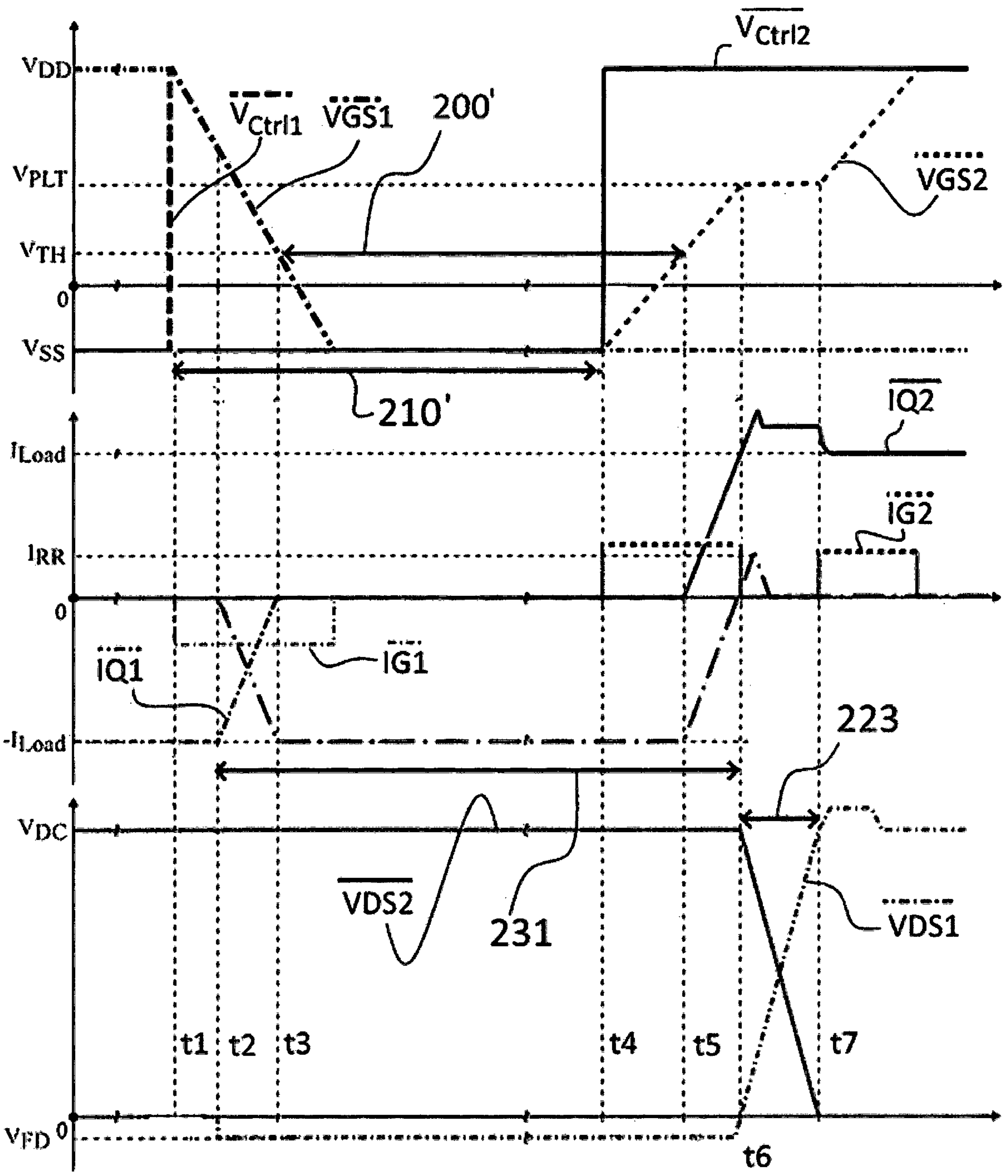
FIG. 3C shows a chart showing traditional dead time timings.

FIG. 3C corresponds to the traditional turn off of the upper switch and turn on of the bottom switch sequence.

The real dead time 200' from t3 to t5 is delayed with respect to the theoretical dead time 210' from t1 to t4 and the diode reverse conduction time 231 of Q1 starts at t2 and ends at t6.

Figure 3D:
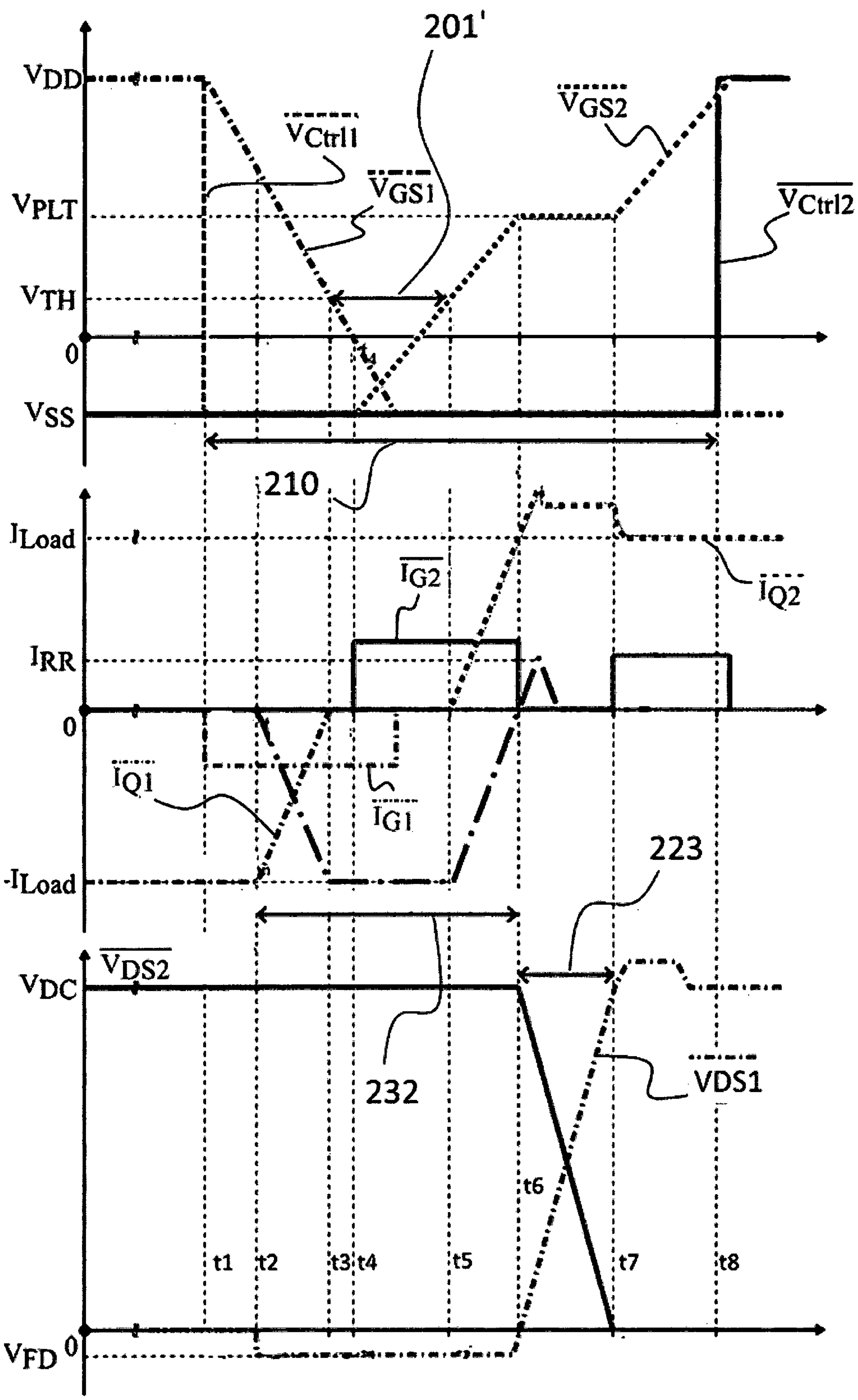
FIG. 3D shows a chart of timings with dead time reduction according to the present disclosure.

The effect of the dead time reduction circuit of the present disclosure is seen in FIG. 3D where $V_{GS2}$ starts to rise at t4 after the presence of IG1 at t1 thus reducing the reverse diode conduction time of Q1 from t2 to t6 allowing a quicker change of conducting device from the upper switch to the lower switch.

Figure 4:
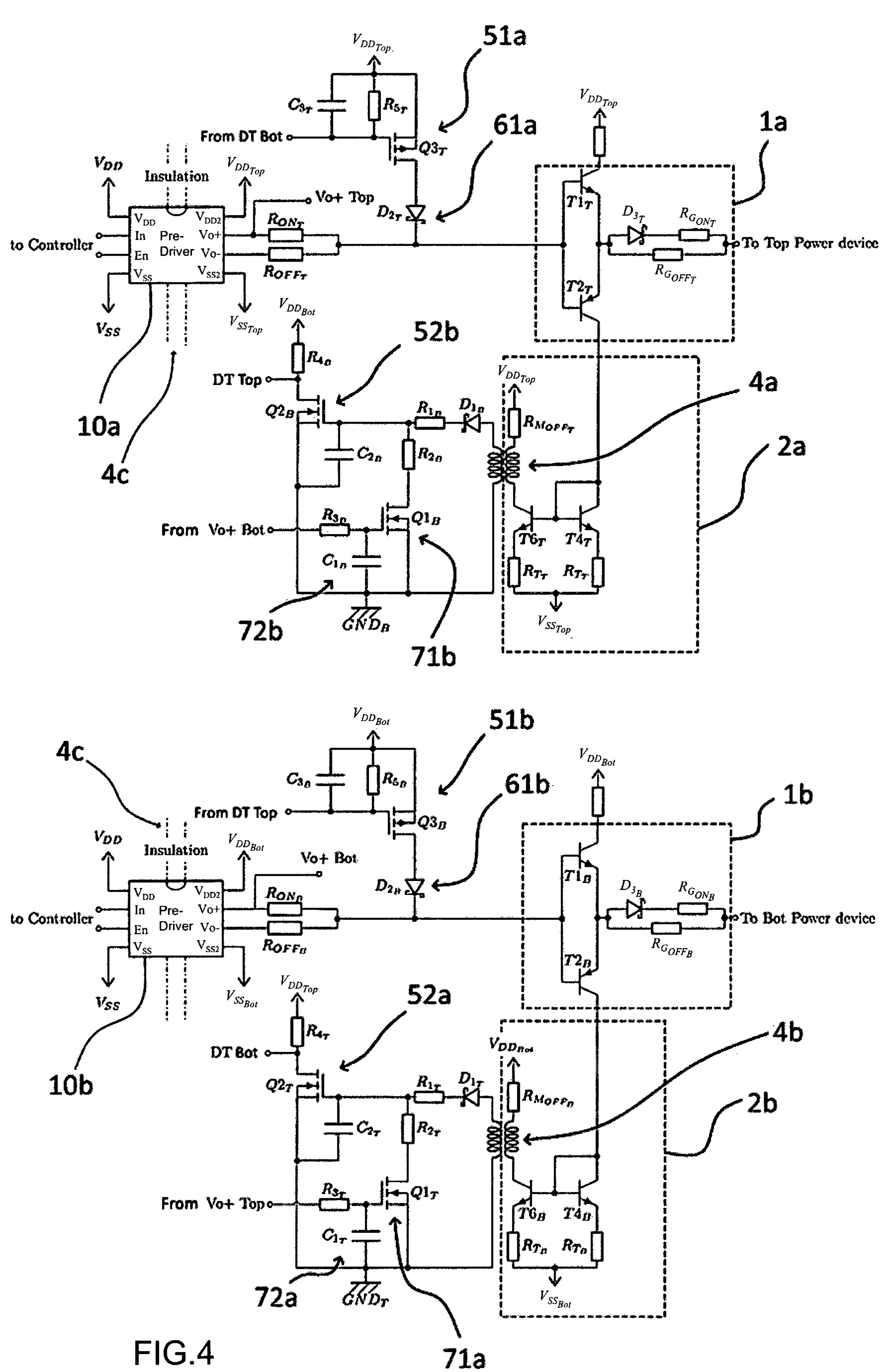
FIG. 4 shows an exemplary embodiment of the dead time reduction circuit of the present disclosure.

FIG. 4 shows a possible realization of the dead time reduction circuit seen in FIG. 2 using MOS transistors.

In such circuit, the insulations between the current mirrors 2*a*, 2*b* and the dead time reduction circuits are done through current transformers 4*a*, 4*b*, MOS transistors 51*a*, 51*b* provide the dead time reduction signals mixed with the Vo+, Vo− signals issued from the pre-drivers through diodes 61*a*, 61*b* while MOS transistors 52*a*, 52*b* amplify the output signals issued from the transformers 4*a*, 4*b* and the MOS transistors 71*a*, 71*b* provide the reset signals issued from the pre-drivers when such pre-drivers provide gate command signals activating such gates with a delay provided by capacitors 72*a*, 72*b*.

Realization of the dead time reduction circuit seen in FIG. 2 may also be done with bipolar transistors or logic gates.

The invention claimed is:

1. A gate driver circuit, for a half bridge of a converter where a first switching device, having a first gate, and a second switching device, having a second gate, are controlled independently and in a complementary way respectively through a first gate driver buffer and a second gate driver buffer, and a controller providing gate pull up and gate pull down pulse signals to the first and second gate drivers buffers, characterized in that it comprises a first gate current mirroring circuit on a sink branch of said first gate driver buffer and a second gate current mirroring circuit on a sink branch of said second gate driver buffer to provide, in advance from said pulse signals issued from the controller, a first early gate pullup command signal issuing from the first gate current mirroring circuit, for the second gate driver buffer under a turning off of said first switching device and a second early gate pullup command signal issuing from the second gate current mirroring circuit, for the first gate driver buffer from a turning off of said second switching device, in advance from gate pull up pulse signals issued from the controller.

2. The gate driver circuit according to claim 1, wherein the gate drivers buffers associated to the current mirroring circuits are driven by pre-driver circuits transferring control signals from the controller to the gate drivers buffers and providing a first galvanic insulation between said controller and said gate drivers buffers.

3. The gate driver circuit according to claim 1, wherein said early gate pullup command signals of the first gate mirroring circuit and the second gate mirroring circuit are transferred respectively to the second gate driver buffer and to the first gate driver buffer through second galvanic insulation means.

4. The gate driver circuit according to claim 3, comprising for each gate driver buffer, a mixer circuit where said early gate pullup command signal is combined with the gate pulse signal issued from said pre-driver after said second galvanic insulation means.

5. The gate driver circuit according to claim 1, comprising conditioning and/or amplifier means of said early command signals.

6. The gate driver circuit according to claim 1, comprising a reset circuit which is configured to reset the early gate pullup command signal upon occurrence of the gate pull up pulse signals issued from the controller.

7. A process for reducing the dead time duration upon switching of switches in a half bridge of a converter comprising sensing of a gate current in a gate driver circuit during an on to off switching transition of a first switch of said half bridge using current mirror to provide a mirrored gate current signal, transferring said mirrored gate current signal through a galvanic insulation circuit, conditioning said mirrored gate current signal to create a gate pull-up command signal, combining said gate pull-up command signal with a gate command signal of a second switch of said half bridge in order to provide an advanced off to on transition of said second switch.

8. The process according to claim 7 comprising resetting said gate pull-up command signal upon occurrence of gate activating pulses of said gate command signal.

* * * * *